(12) United States Patent
Shapira

(10) Patent No.: US 9,836,117 B2
(45) Date of Patent: Dec. 5, 2017

(54) AUTONOMOUS DRONES FOR TACTILE FEEDBACK IN IMMERSIVE VIRTUAL REALITY

(71) Applicant: Microsoft Technology Licensing, LLC, Redmond, WA (US)

(72) Inventor: Lior Shapira, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/724,360

(22) Filed: May 28, 2015

(65) Prior Publication Data

US 2016/0349835 A1 Dec. 1, 2016

(51) Int. Cl.
*G06F 3/01* (2006.01)
*B25J 9/16* (2006.01)
(Continued)

(52) U.S. Cl.
CPC ............. *G06F 3/011* (2013.01); *B25J 9/1605* (2013.01); *G02B 27/017* (2013.01);
(Continued)

(58) Field of Classification Search
CPC ......... G06F 3/011; G06F 3/016; B25J 9/1605; G02B 27/017; G05D 1/0038; G06T 19/006
See application file for complete search history.

(56) References Cited

U.S. PATENT DOCUMENTS 5,900,849 A * 5/1999 Gallery ................. G06F 3/011
345/8
6,152,854 A * 11/2000 Carmein ................ G06F 3/011
482/4

(Continued)

FOREIGN PATENT DOCUMENTS

EP 0772790 A1 5/1997
EP 2693255 A1 2/2014
(Continued)

OTHER PUBLICATIONS

"International Search Report and Written Opinion Issued in PCT Application No. PCT/US2016/030618", Mailed date: Jul. 12, 2016, 11 Pages.

(Continued)

*Primary Examiner* — Dale W Hilgendorf
(74) *Attorney, Agent, or Firm* — Lyon & Harr, LLP; Mark A. Watson

(57) ABSTRACT

A "Tactile Autonomous Drone" (TAD) (e.g., flying drones, mobile robots, etc.) supplies real-time tactile feedback to users immersed in virtual reality (VR) environments. TADs are not rendered into the VR environment, and are therefore not visible to users immersed in the VR environment. In various implementations, one or more TADs track users as they move through a real-world space while immersed in the VR environment. One or more TADs apply tracking information to autonomously position themselves, or one or more physical surfaces or objects carried by the TADs, in a way (Continued)

Swarm of "Tactile Autonomous Drones" around User that enables physical contact between those surfaces or objects and one or more portions of the user's body. Further, this positioning of surfaces or objects corresponds to some real-time virtual event, virtual object, virtual character, virtual avatar of another user, etc., in the VR environment to provide real-time tactile feedback to users immersed in the VR environment.

20 Claims, 5 Drawing Sheets

(51) Int. Cl.
  G06T 19/00  (2011.01)
  G05D 1/00  (2006.01)
  G02B 27/01  (2006.01)
  B64C 39/02  (2006.01)
(52) U.S. Cl.
  CPC ........... G05D 1/0038 (2013.01); G06F 3/016 (2013.01); G06T 19/006 (2013.01); B64C 39/024 (2013.01); G02B 27/01 (2013.01)

(56) References Cited

U.S. PATENT DOCUMENTS

| | | |
|---|---|---|
| 6,191,796 B1 | 2/2001 | Tarr |
| 6,268,862 B1 | 7/2001 | Uchiyama et al. |
| 6,441,815 B1 | 8/2002 | McDowall et al. |
| 6,891,518 B2 | 5/2005 | Sauer et al. |
| 7,398,481 B2 | 7/2008 | Kraus et al. |
| 7,864,168 B2 | 1/2011 | French |
| 7,864,173 B2 | 1/2011 | Handley et al. |
| 7,889,195 B2 | 2/2011 | Shih et al. |
| 7,973,786 B2 | 7/2011 | Gyorfi et al. |
| 8,225,226 B2 | 7/2012 | Skourup et al. |
| 8,243,099 B2 | 8/2012 | Ryu et al. |
| 8,271,365 B2 | 9/2012 | Jung et al. |
| 8,350,843 B2 | 1/2013 | Rogowitz et al. |
| 8,384,665 B1 | 2/2013 | Powers, III et al. |
| 8,553,049 B2 | 10/2013 | Nogami et al. |
| 8,574,076 B2 | 11/2013 | Mahajan et al. |
| 8,576,276 B2 | 11/2013 | Bar-Zeev et al. |
| 8,585,476 B2 | 11/2013 | Mullen |
| 8,624,924 B2 * | 1/2014 | Dobbins .................. G06F 3/011 345/633 |
| 8,730,156 B2 | 5/2014 | Weising et al. |
| 2002/0190989 A1 | 12/2002 | Kamata et al. |
| 2005/0131846 A1* | 6/2005 | Kurzweil .................. G06F 3/016 706/1 |
| 2006/0024647 A1 | 2/2006 | Chesnais et al. |
| 2006/0105838 A1 | 5/2006 | Mullen |
| 2006/0209019 A1 | 9/2006 | Hu |
| 2008/0180654 A1 | 7/2008 | Bathiche et al. |
| 2008/0215994 A1 | 9/2008 | Harrison et al. |
| 2008/0266323 A1 | 10/2008 | Biocca et al. |
| 2009/0225074 A1 | 9/2009 | Bates et al. |
| 2009/0262118 A1 | 10/2009 | Arikan et al. |
| 2010/0103075 A1 | 4/2010 | Kalaboukis et al. |
| 2010/0103196 A1 | 4/2010 | Kumar et al. |
| 2010/0315412 A1 | 12/2010 | Sinha et al. |
| 2011/0078592 A1 | 3/2011 | Dawson et al. |
| 2011/0216089 A1 | 9/2011 | Leung |
| 2012/0017147 A1 | 1/2012 | Mark |
| 2012/0113223 A1 | 5/2012 | Hilliges et al. |
| 2012/0122570 A1 | 5/2012 | Baronoff |
| 2012/0139906 A1 | 6/2012 | Zhang et al. |
| 2012/0142415 A1* | 6/2012 | Lindsay ................ G06T 19/006 463/33 |
| 2012/0147039 A1* | 6/2012 | Wang .................... G06T 19/006 345/633 |
| 2012/0249587 A1 | 10/2012 | Anderson et al. |
| 2012/0264510 A1 | 10/2012 | Wigdor et al. |
| 2013/0093788 A1 | 4/2013 | Liu et al. |
| 2013/0120365 A1 | 5/2013 | Lee et al. |
| 2013/0141421 A1 | 6/2013 | Mount et al. |
| 2013/0196772 A1 | 8/2013 | Latta et al. |
| 2013/0222393 A1 | 8/2013 | Merrell et al. |
| 2013/0296043 A1 | 11/2013 | Weinshanker et al. |
| 2013/0335405 A1 | 12/2013 | Scavezze et al. |
| 2014/0022283 A1 | 1/2014 | Chan et al. |
| 2014/0104274 A1 | 4/2014 | Hilliges et al. |
| 2014/0128161 A1 | 5/2014 | Latta et al. |
| 2014/0139551 A1 | 5/2014 | McCulloch et al. |
| 2014/0152558 A1 | 6/2014 | Salter et al. |
| 2014/0160157 A1 | 6/2014 | Poulos et al. |
| 2014/0168264 A1 | 6/2014 | Harrison et al. |
| 2014/0285518 A1 | 9/2014 | Tanaka et al. |
| 2014/0361977 A1 | 12/2014 | Stafford et al. |
| 2014/0364215 A1 | 12/2014 | Mikhailov et al. |
| 2014/0368537 A1 | 12/2014 | Salter et al. |
| 2015/0024368 A1 | 1/2015 | King, Jr. |
| 2015/0235434 A1* | 8/2015 | Miller .................... G06T 19/006 345/633 |
| 2016/0054837 A1* | 2/2016 | Stafford ................. G06F 3/011 463/33 |

FOREIGN PATENT DOCUMENTS

| | | |
|---|---|---|
| EP | 2724191 A2 | 4/2014 |
| WO | 9719398 A1 | 5/1997 |
| WO | 2011112328 A2 | 9/2011 |
| WO | 2013155217 A1 | 10/2013 |
| WO | 2014033722 A1 | 3/2014 |
| WO | 2014053346 A1 | 4/2014 |
| WO | 2015006784 A2 | 1/2015 |

OTHER PUBLICATIONS

Mine, Mark R., "Virtual Environment Interaction Techniques", In Computer Science Technical Report TR95-018, May 5, 1995, 18 Pages.
Ye, et al., "VisHap: Augmented Reality Combining Haptics and Vision", In Proceedings of IEEE International Conference on Systems, Man and Cybernetics, vol. 4, Oct. 5, 2003, pp. 3425-3431.
Kale, Emory, "Disney Research Develops Method to Provide Tactile Feedback in Free Air", Published on: Jul. 19, 2013, Available at: http://www.tgdaily.com/general-science-brief/72566-disney-research-develops-method-to-provide-tactile-feedback-in-free-air.
Thimmesch, Debra, "Japanese Tech Firm, Miraisens, Unveils New "Touchable" 3D Technology Which May Influence 3D Printing", Published on: Sep. 4, 2014, Available at: http://3dprint.com/13596/touchable-3d-technology/.
Dubey, et al., "Inertia Reduction in Haptic Devices Using Force Feedback Method", In International Journal of Advanced Research in Computer Science and Software Engineering, vol. 2, Issue 8, Aug. 2012, pp. 28-36.
Sung, Dan, "The World's Most Hotly Anticipated Wearables", Published on: Feb. 25, 2015 Available at: http://www.wareable.com/internet-of-things/the-worlds-most-hotly-anticipated-wearables.
Bohil, et al., "Anatomy of a Virtual Environment", In Journal of Nature Reviews Neuroscience, Dec. 2011, 4 pages.
Subramanian, et al., "Feeling Virtual Objects in Mid-Air Using Ultrasound", In Proceedings of ACM Transactions on Graphics, Dec. 3, 2014, 3 pages.
"Haptic Interfaces", Published on: Apr. 16, 2013 Available at: http://research.vancouver.wsu.edu/dr-hakan-gurocak/haptic-interfaces.
Regenbrecht, et al., "Virtual Reality Aided Assembly with Directional Vibro-Tactile Feedback", In Proceedings of the 3rd international conference on Computer graphics and interactive techniques, Nov. 29, 2005, 9 pages.
Jarvis, Matthew., "Backed to the Future: The Crowdfunded Tech of 2014 and Beyond", Published on: Dec. 6, 2013 Available at: http://www.pcr-online.biz/news/read/backed-to-the-future-the-crowdfunded-tech-of-2014-and-beyond/032657.
Billinghurst, M., et al, Tangible augmented reality, presetned at the ACM SIGGRAPH ASIA 2008 courses, Singapore, Dec. 2008, pp. 1-10.

(56) References Cited

OTHER PUBLICATIONS

Broll, W., et al, "The virtual round table: A collaborative augmented multi-user environment," Proc. of the 3rd Int'l Conf. on Collaborative Virtual Environments, CVE 2000, Sep. 10-12, 2000, pp. 39-45.
Basso, C., et al., Fitting 3D morphable models using implicit representations, J. of Virtual Reality and Broadcasting, vol. 4, No. 18, Apr. 2007, pp. 1-10.
International Search Report and Written Opinion, PCT/US2016/016039, Mailed Date: Jun. 6, 2016, 14 pages.
Bailenson, Jeremy N., "Transformed Social Interaction in Collaborative Virtual Environments", In Proceedings of Digital Media: Transformations in Human Communication, Jan. 2006, pp. 1-20.
Biggers, et al., "Inference-based Surface Reconstruction of Cluttered Environments", In Technical Report Tamu-CS-TR-2009-6-1, Aug. 2012, 12 pages.
Dodds, Trevor, "Trevor Dodds—Max Plank Institute for Biological Cybernetics", Published on: Jul. 6, 2013, Available at: http://www.kyb.tuebingen.mpg.de/nc/employee/details/dodds.html.
Fisch, et al., "Haptic Devices for Virtual Reality, Telepresence and Human-Assistive Robotics", In Proceedings of Biologically-Inspired Intelligent Robots, May 13, 2003, 24 pages.
Fleury, et al., "A Generic Model for Embedding Users' Physical Workspaces into Multi-Scale Collaborative Virtual Environments", In 20th International Conference on Artificial Reality and Telexistence (ICAT), Dec. 1, 2010, 8 pages.
Fuchs, et al., "Virtually Face-To-Face: Telecommunication and Collaboration using Virtual Reality", In Proceedings of IEEE Virtual Reality, Mar. 16, 2013, 3 pages.
Hammer, et al., "Robust hand Tracking in Realtime using a Single Head-Mounted RGB Camera", In Proceedings of 15th International Conference, HCI International, Part 4, Jul. 21, 2013, 4 pages.
Hill, Matt., Opinion: Oculus selling to Facebook is no shock, the future of VR is not games, Published on: Mar. 26, 2014, Available at: http://www.t3.com/news/opinion-oculus-selling-to-facebook-is-no-shock-the-future-of-vr-is-not-games-1.
Hrimech, et al., "How 3D Interaction Metaphors Affect User Experience in Collaborative Virtual Environment", In: Journal of Advances in Human-Computer Interaction, vol. 2011, Jan. 1, 2011, 18 pages.
Kanbara, et al., "A Stereoscopic Video see-through Augmented Reality System based on Real-Time vision-based Registration", In Proceedings of IEEE Virtual Reality, Mar. 18, 2000, 8 pages.
Knopf, et al., "Reconstructing complex scenes for virtual reality", In SPIE, Oct. 20, 2011, 3 pages.
MacKay, Wendy E., Augmented Reality: Linking Real and Virtual Worlds a New Paradigm for Interacting With Computers, In Proceedings of ACM Conference on Advanced Visual Interfaces, May 24, 1998, 10 pages.
Merrell, et al., "Interactive Furniture Layout Using Interior Design Guidelines" ACM Transactions on Graphics Proc., SIGGRAPH 2011, 9 pages.
Milgram, et al., "A Taxonomy of Mixed Reality Visual Displays", In Proceedings of IEICE Transactions on Information and Systems, vol. E77-D, No. 12, Dec. 1994, 14 pages.
Nystrom, et al., "Modern Web and Video Technologies Survey for New Interactions", In Compeit Survey, Nov. 2013, 22 pages.
Patkar, et al., "Marker Based Augmented Reality Using Android OS", In International Journal of Advanced Research in Computer Science and Software Engineering, vol. 3, Issue 5, May, 2013, 6 pages.
Posada, et al., "Semantic Classification of Scenes and Places with Omnidirectional Vision", In European Conference on Mobile Records, Sep. 25, 2013, pp. 113-118.
Rhienmora, et al., "Augmented Reality Haptics System for Dental Surgical Skills Training", In Proceedings of 17th ACM Symposium on Virtual Reality Software and Technology, Nov. 22, 2010, 2 pages.
Sampson, Demetrios G., Book Review "Collaborative Virtual Environments: Digital Places and Spaces for Interaction", In Journal of Educational Technology & Society, vol. 5, Issue 4, Oct. 2002, 3 pages.
Smelik, et al., "A Survey on Procedural Modeling for Virtual Worlds", In Computer Graphics Forum, Jan. 15, 2014, 20 pages.
Snowdon et al., Collaborative Collaborative Virtual Environments: Digital Spaces and Places for CSCW: An Introduction, Springer Verlag, 2000, pp. 1-34.
Verdie, et al. "Detecting parametric objects in large scenes by Monte Carlo sampling." International Journal of Computer Vision, Springer Verlag (Germany), 2014, 106(1), pp. 57-75.
VHIL: Virtual Human Interaction Lab, Retrieved on: Mar. 9, 2015, Available at: http://vhil.stanford.edu/projects/archive/.
Virtual Reality Blog, Collaborative Virtual Environments, Published on: Dec. 22, 2013, Available at: http://www.vrs.org.uk/virtual-reality-environments/collaborative.html.
Virtual Reality Blog, The Virtual Reality Headset, Published on: May 3, 2009, Available at: http://www.vrs.org.uk/virtual-reality/headset.html.
Yu, et al., Make it Home: Automatic Optimization of Furniture Arrangement. ACM Trans. Graph. 30, 4, Article 86 (Jul. 2011), 11 pages.
Wu, Sing-Wai, U.S. Office Action, U.S. Appl. No. 14/633,661, Aug. 24, 2016, pp. 1-36.
Pan, et al., "Virtual Reality and Mixed Reality for Virtual Learning Environments," Computer & Graphics, vol. 30, No. 1, Feb. 2006, pp. 20-28.
Sud, et al., Real-Time Path Planning in Dynamic Virtual Environment Using Multiagent Navigation Graphs, IEEE Trans. Vis. Comput. Graph., vol. 14, No. 3, May/Jun. 2008, pp. 526-538.
Zhai, U.S. Office Action, U.S. Appl. No. 14/724,503, dated Jan. 13, 2017, pp. 1-20.
"Second Written Opinion Issued in PCT Application No. PCT/US2016/030619", dated Apr. 25, 2017, 13 Pages.
Wu, U.S. Final Office Action, U.S. Appl. No. 14/633,661, dated Mar. 2, 2017, pp. 1-44.
Zhai, U.S. Final Office Action, U.S. Appl. No. 14/724,503, dated May 17, 2017, pp. 1-24.
Billinghurst M., et al., Collaboration with tangible augmented reality interfaces. In HCI Int'l, Aug. 2001, vol. 1, pp. 5-10.
Schmalstieg, D., et al., Bridging multiple user interface dimensions with augmented reality, Proceedings IEEE and ACM International Symposium on Augmented Reality (ISAR 2000), Munich, Oct. 2000, pp. 20-29.
International Preliminary Report on Patentability Issued in PCT Application No. PCT/US2016/016039, dated May 9, 2017, 10 pages.
Wu, U.S. Office Action, U.S. Appl. No. 14/633,661, dated Jun. 28, 2017, pp. 1-47.
Zhai, U.S. Notice of Allowance, U.S. Appl. No. 14/724,503, dated Oct. 4, 2017, pp. 1-9.

\* cited by examiner

Exemplary Flying Multi-Copter Drone TAD Implementation

Exemplary Wheeled Vehicle TAD Implementation

Exemplary Tracked Vehicle TAD Implementation

AUTONOMOUS DRONES FOR TACTILE FEEDBACK IN IMMERSIVE VIRTUAL REALITY

BACKGROUND

Many applications for augmented reality (AR) devices and scenarios construct augmented content, such as 2D overlays, text, virtual objects, etc. Augmented content may also be added to other types of applications, such as 2D overlays and text over an image. In other words, an AR device often shows a view of the world, with some overlay layer of information. In contrast to these types of AR scenarios, virtual reality (VR) devices, such as a wearable headset, generally present the user with a completely virtual environment.

A variety of mechanisms exist that provide haptic feedback in both AR and VR scenarios. For example, such mechanisms include haptic devices that are held by or attached to the user. Examples of these types of haptic devices include force-feedback video game controllers, wearable gloves that provide sensation or stimulation to the user's hand, movable arms that contact the user's finger or hand, directed air blasts, directed sound fields, etc. These types of haptic feedback devices are generally synched to AR, VR or other media content that is being presented to the user to enhance the user experience with various types of tactile sensations.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, a "Tactile Autonomous Drone" (TAD) (e.g., flying drones, mobile robots, autonomous vehicles, etc.) supplies real-time tactile feedback to users immersed in virtual reality (VR) environments. TADs are not rendered into the VR environment and are therefore not visible to users immersed in the VR environment. In various implementations, one or more TADs, or sensors accessible to one or more TADs, track TAD positions relative to the positions and motions of users as they move through a real-world space while immersed in the VR environment. In various implementations, one or more TADs apply the resulting tracking information to automatically position themselves, or one or more physical surfaces or objects carried by the TADs, in a way that enables physical contact between those surfaces or objects and one or more portions of the user's body. In further implementations, a computer-based or cloud-based control system directs and positions one or more TADs based on user and TAD position and tracking information. In either case, this positioning of surfaces or objects corresponds to real-time virtual events, virtual objects, virtual characters, virtual avatar of another user, etc., in the VR environment to provide real-time tactile feedback to users immersed in the VR environment.

In other words, in various implementations, autonomous drones (or swarms of multiple drones) move about within a real-world physical space in which users are participating in an immersive virtual environment. These autonomous drones provide various functions and services with respect to one or more users. Further, because the drones are not rendered into the immersive virtual environment, those drones provide the various functions and services without being seen by the user, thereby enhancing the user experience and sense of reality when participating in immersive virtual environments. In various implementations, these functions and services include, but are not limited to, comprehensive tactile feedback and positioning of real-world objects to exert force on the user in any position in the world in a way that corresponds to real-time virtual events and virtual characters in the immersive virtual environment.

For example, in various implementations, the TAD applies one or more sensors that capture real-time tracking information relating to real user motions of a user immersed in the virtual environment. One or more autonomous mobile drones then move relative to the user based on the tracking information. This movement enables one or more of the autonomous mobile drones to automatically position themselves relative to the user in a manner that causes a tactile surface of the drone (or some real object carried, dropped, or otherwise positioned by the drone) to contact one or more user body parts based on corresponding real user motions while the user interacts with the virtual environment. As such, the TAD enhances user experience and sense of reality when participating in immersive virtual environments by causing contact between real surfaces and one or more user body parts to generate a physically tactile reality corresponding to one or more real-time virtual events, virtual characters, virtual objects or object motions, etc., occurring within the virtual environment.

The TAD applies one or more autonomous mobile drones to create real-world real-time tactile feedback corresponding to real-time virtual events, real-time virtual characters, and real-time virtual object positions and motions while the user moves through a real-world space during an immersive VR experience. In addition to the benefits described above, other advantages of the TAD will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
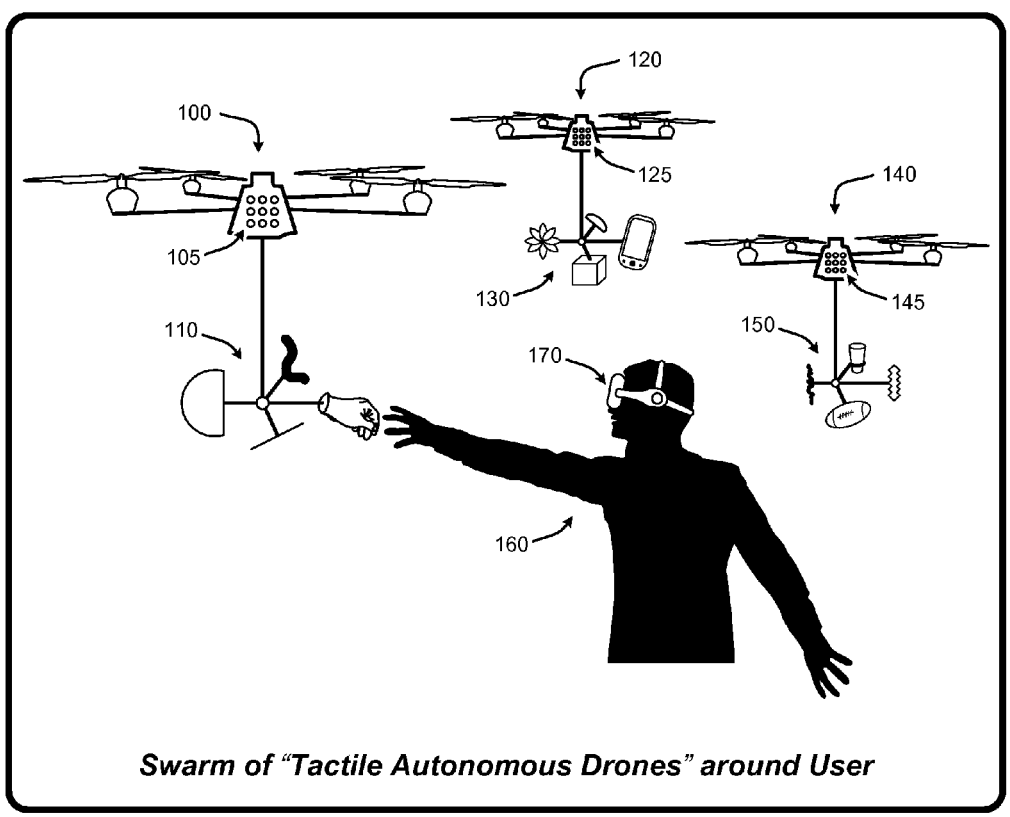
FIG. 1 illustrates a swarm of a "Tactile Autonomous Drones" (TAD) moving around a user to provide tactile feedback in immersive virtual reality (VR) environments, as described herein.

In the following description of various implementations of a "Tactile Autonomous Drone" (TAD), reference is made to the accompanying drawings, which form a part hereof, and in which is shown by way of illustration specific implementations in which the TAD may be practiced. Other implementations may be utilized and structural changes may be made without departing from the scope thereof.

Specific terminology will be resorted to in describing the various implementations described herein, and that it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the TAD. Further, the appearance of such phrases throughout the specification are not necessarily all referring to the same implementation, and separate or alternative implementations are not mutually exclusive of other implementations. The order described or illustrated herein for any process flows representing one or more implementations of the TAD does not inherently indicate any requirement for the processes to be implemented in the order described or illustrated, and any such order described or illustrated herein for any process flows do not imply any limitations of the TAD.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

In general, a "Tactile Autonomous Drone" (TAD), e.g., flying drones, mobile robots, autonomous vehicles, etc., creates real-world real-time tactile feedback corresponding to real-time virtual events, real-time virtual characters, and real-time virtual object positions and motions while the user moves through a real-world space during an immersive virtual reality (VR) experience.

More specifically, the TAD supplies real-time tactile feedback to users immersed in virtual reality (VR) environments. TADs are not rendered into the VR environment and are therefore not visible to users immersed in the VR environment. In various implementations, one or more TADs, or sensors accessible to one or more TADs, track TAD positions relative to the positions and motions of users as they move through a real-world space while immersed in the VR environment. In various implementations, one or more TADs apply the resulting tracking information to automatically position themselves, or one or more physical surfaces or objects carried by the TADs, in a way that enables physical contact between those surfaces or objects and one or more portions of the user's body. In further implementations, a computer-based or cloud-based control system directs and positions one or more TADs based on user and TAD position and tracking information. In either case, this positioning of surfaces or objects corresponds to real-time virtual events, virtual objects, virtual characters, virtual avatar of another user, etc., in the VR environment to provide real-time tactile feedback to users immersed in the VR environment.

For example, as illustrated by FIG. 1, in various implementations a plurality of TADs (100, 120, 140) act as a swarm or group of autonomous drones that track and move relative to a user 160. This tracking and motion is based on the use of a global coordinate system that is synched to both the real-world environment of the user and to the immersive VR environment being presented to the user.

Tracking is accomplished by obtaining TAD and user tracking information through the use of any combination of sensors (105, 125, 145) coupled to the TADs (100, 120, 140), sensors (not shown) deployed throughout the real-world environment, and sensors (not shown) worn or carried by the user 160. Examples of such sensors include, but are not limited to, GPS, proximity sensors (e.g., ultrasonic, capacitive, photoelectric, inductive, magnetic, RFID, etc.), motion sensors (e.g., visible light, infrared light, ultrasound, microwave, radar, accelerometers, inertial sensors, etc.), image sensors, touch sensors, microphones, etc.

One or more of the TADs (100, 120, 140) include or carry a plurality of surfaces and objects (e.g., 110, 130, 150). Each of the TADs (100, 120, 140) is capable of maneuvering itself and rotating or positioning its surfaces and objects (e.g., 110, 130, 150) in such a way that contact between the user 160 and those surfaces and objects occurs based on real-time user interaction with the immersive virtual environment. In various implementations, the TADs (100, 120, 140) automatically maintain a safety perimeter or distance from the user 160 at all times to avoid inadvertent contact between the user and any fixed or moving parts of the TAD. Further, in various implementations, as illustrated by FIG. 1, the surfaces and objects (e.g., 110, 130, 150) of each TAD are suspended from a rod or the like to enable the main body of the TAD to increase the distance between itself and the user 160. In various implementations, TAD's may pick up and move one or more real-world objects that may them be contacted and picked up or used by the user while the user is immersed in the virtual environment.

In various implementations, the immersive virtual environment is presented to the user 160 via a head-worn VR display device 170 (which may also include an audio output source, not shown). This head-worn VR display device 170 is capable of controlling the user's entire field of vision on a pixel-by-pixel basis. As such, unless one or more of the TADs (100, 120, 140) is rendered into the immersive virtual environment, those TADs will not be visible to the user. Similarly, in other implementations, the immersive virtual environment is presented to the user via display devices in eye-worn contact lenses or the like (not shown) that cover and control the user's field of vision.

In the example of FIG. 1, the user 160 is reaching out to contact the hand of a virtual character in the immersive virtual environment. In response, TAD 100 positions an artificial hand contained in the plurality of surfaces and objects 110 of that TAD. In various implementations, this artificial hand may be passive (e.g., no moving parts), or it may be robotic in the sense that it can move, high-five or grip the user's hand, etc., so as to provide lifelike tactile feedback to the user when the user reaches out to contact the hand of a virtual character in the immersive virtual environment.

One or more of the TADs (100, 120, 140) is capable of picking up, moving, and dropping off objects in the real-world environment of the user 160. For example, TAD 120 can drop a real (or toy) physical object (see surfaces and objects 130) in a position in the real-world environment that maps to a virtual location in the immersive virtual environment. Similarly, TAD 120 can position itself, and the real (or toy) object in such a way that it appears to the user that a virtual character in the immersive virtual environment is offering the object to the user 160. The user 160 can then reach out and physically grasp that object as if the virtual character had actually handed it to the user. In other words, one or more of the TADs (100, 120, 140) automatically position themselves in the real world environment in a way that maps to a corresponding position in the immersive virtual environment in order to present real surfaces and objects to the user 160 in a way that provides real-world real-time tactile truth to virtual elements of the immersive virtual environment.

Figure 2:
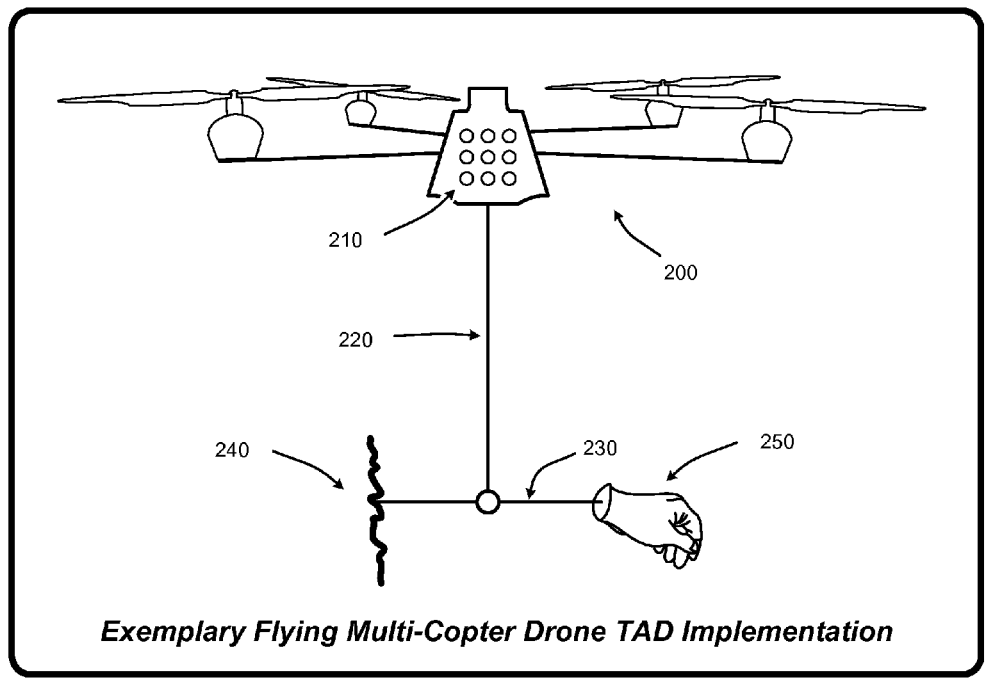
FIG. 2 illustrates an exemplary multi-copter drone TAD implementation, as described herein.
Figure 3:
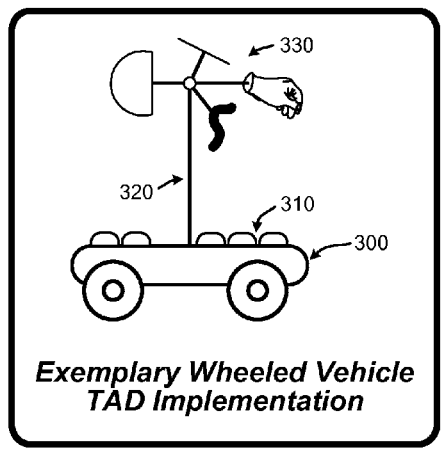
FIG. 3 illustrates an exemplary wheeled vehicle TAD implementation, as described herein.
Figure 4:
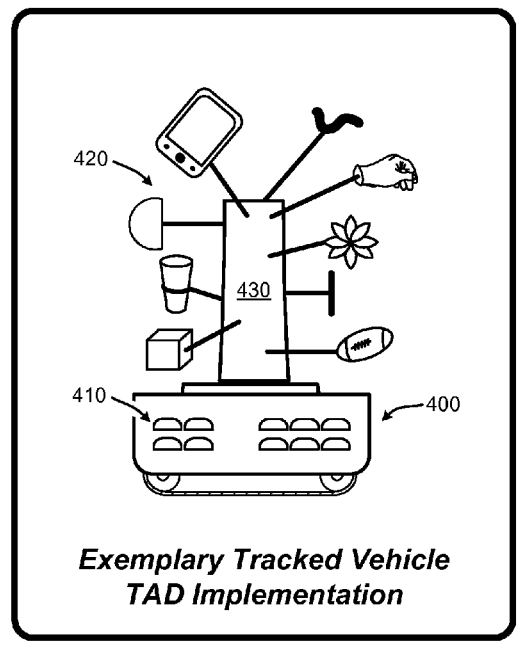
FIG. 4 illustrates an exemplary tracked vehicle TAD implementation, as described herein.

Exemplary implementations of several different form factors of the TAD are illustrated by FIG. 2 through FIG. 4. These exemplary form factors are provided only for purposes of discussion and that the TAD is not intended to be limited to the form factors illustrated by FIG. 2 through FIG. 4. In fact, as mentioned above, the TAD can be implemented using any desired form of flying drones, mobile robots, autonomous vehicles, etc. Furthermore, multiple TADs, each having either the same or a different form factor from one or more other TADs may operate together to implement the features and capabilities described herein for providing real-world real-time tactile feedback corresponding to real-time virtual events, real-time virtual characters, and real-time virtual object positions and motions while the user moves through a real-world space during an immersive VR experience.

FIG. 2 illustrates a TAD 200 in the form of a flying multi-copter drone. In general, this TAD 200 includes a sensor suite 210. As discussed in further detail herein, the sensor suite 200 enables the TAD 200 to track its own position and the position and motions of other TADs, track one or more users, track moving real objects, people, etc. in the real world environment around the user, navigate and position itself (and objects or surfaces carried by the TAD) relative to the user, etc. This exemplary TAD 200 also includes an optionally rotatable and optionally telescoping member or rod 220 extending from the base of the TAD. This enables the TAD 200 to position one or more objects or surfaces (e.g., textured surface 240, and robotic hand 250) relative to the user to provide the aforementioned tactile feedback upon contact or interaction with the user. Further, objects such as the robotic hand 250 may be coupled to members or rods 230 that may rotate, translate, extend, contract, etc., in multiple dimensions relative to rod 220 to assist the TAD 200 in accurately positioning such objects and surfaces relative to the user.

FIG. 3 illustrates a TAD 300 in the form of a wheeled vehicle. In general, this TAD 300 includes a sensor suite 310. As discussed in further detail herein, the sensor suite 310 enables the TAD 300 to track its own position and the position and motions of other TADs, track one or more users, track moving real objects, people, etc. in the real world environment around the user, navigate and position itself (and objects or surfaces carried by the TAD) relative to the user, etc. This exemplary TAD 300 also includes an optionally rotatable and optionally telescoping member or rod 320 extending from the base of the TAD. This enables the TAD 300 to position one or more objects or surfaces 330 relative to the user to provide the aforementioned tactile feedback upon contact or interaction with the user.

Similarly, FIG. 4 illustrates a TAD 400 in the form of a tracked vehicle. In general, this TAD 400 includes a sensor suite 410. As discussed in further detail herein, the sensor suite 410 enables the TAD 400 to track its own position and the position and motions of other TADS, track one or more users, track moving real objects, people, etc. in the real world environment around the user, navigate and position itself (and objects or surfaces carried by the TAD) relative to the user, etc. This exemplary TAD 400 also includes an optionally rotatable and optionally telescoping turret 430 extending from the TAD. This turret 430 includes a plurality of surfaces and objects 420 that may be positioned by moving the TAD 400 and rotating and/or extending the turret 430 to position one or more objects or surfaces 420 relative to the user to provide the aforementioned tactile feedback upon contact or interaction with the user.

Figure 5:
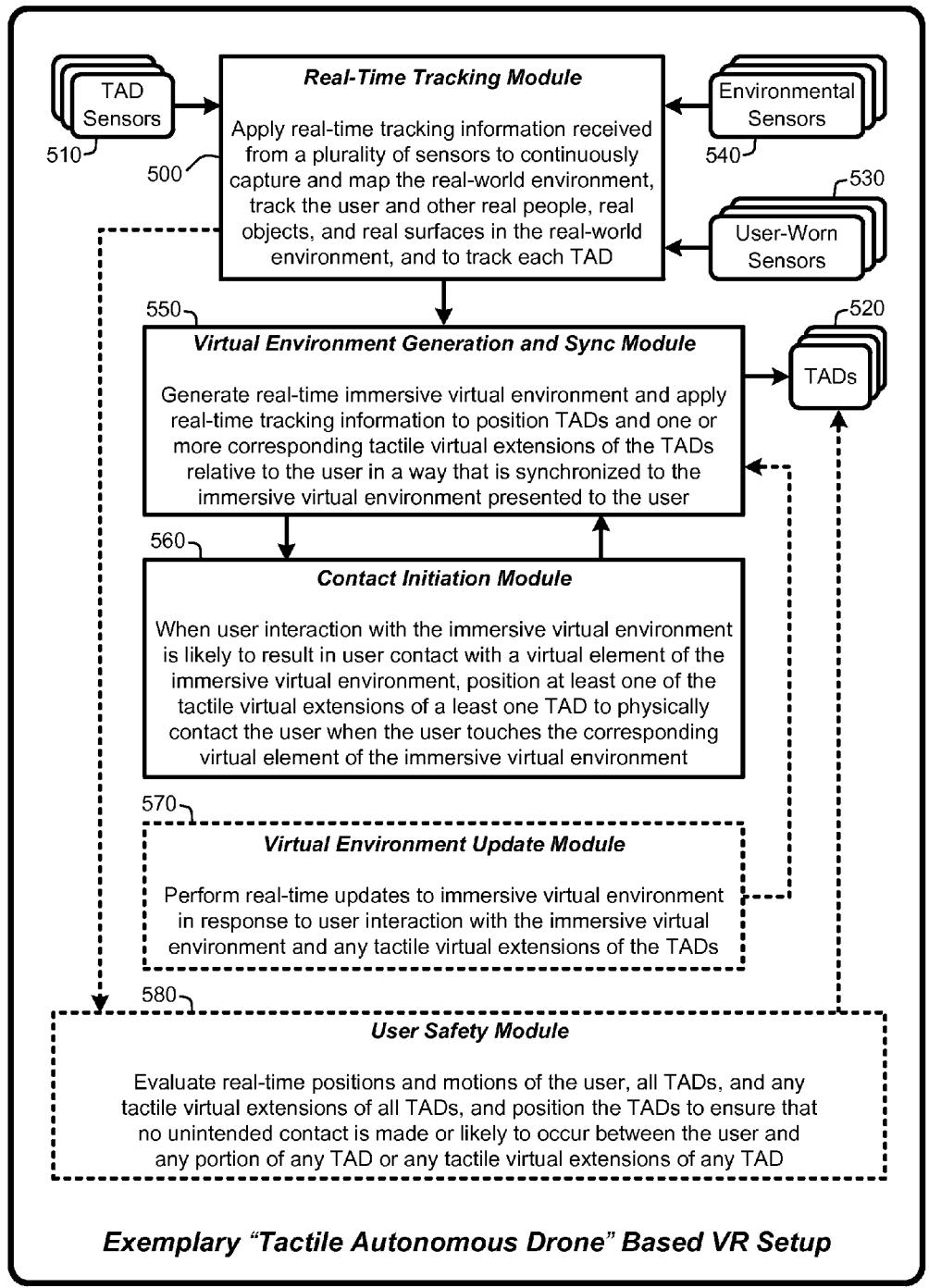
FIG. 5 provides an exemplary architectural flow diagram that illustrates program modules for effecting an exemplary TAD-based VR setup, as described herein.

1.1 System Overview:

As mentioned above, the TAD applies one or more autonomous mobile drones to create real-world real-time tactile feedback corresponding to real-time virtual events, real-time virtual characters, and real-time virtual object positions and motions while the user moves through a real-world space during an immersive VR experience. The processes summarized above are illustrated by the general system diagram of FIG. 5. In particular, the system diagram of FIG. 5 illustrates the interrelationships between program modules for implementing various implementations of the TAD, as described herein. Furthermore, while the system diagram of FIG. 5 illustrates a high-level view of various implementations of the TAD, FIG. 5 is not intended to provide an exhaustive or complete illustration of every possible implementation of the TAD as described throughout this document.

In addition, any boxes and interconnections between boxes that may be represented by broken or dashed lines in FIG. 5 represent alternate implementations of the TAD described herein, and that any or all of these alternate implementations, as described below, may be used in combination with other alternate implementations that are described throughout this document.

As illustrated by FIG. 5, in various implementations, the processes enabled by the TAD begin operation by using a real-time tracking module 500 that applies real-time tracking information received from a plurality of sensors (510, 530, 540) to continuously capture and map a real-world environment around a user, and to track the user and other real people, real objects, and real surfaces in the real-world environment. In addition, the real-time tracking module 500 track the motion and positions of each of a plurality of TADs 520.

A virtual environment generation and sync module 550 then generates a real-time immersive virtual environment and applies the real-time tracking information to position the TADs 520 and one or more corresponding "tactile virtual extensions" (defined herein as any physical object or surface that may be positioned by the TAD) relative to the user. Further, this positioning of TADs 520 and tactile virtual extensions is performed in a way that is synchronized in real-time to the immersive virtual environment being presented to the user.

A contact initiation module 560 then determines whether a user is likely to attempt contact with a virtual element of immersive virtual environment. Then, when user interaction with the immersive virtual environment is likely to result in user contact with a virtual element of the immersive virtual environment, the contact initiation module 560 positions at least one of the tactile virtual extensions of a least one of the TADs 520 to physically contact the user at the same time that the user touches the corresponding virtual element.

In various implementations, a virtual environment update module 570 operates throughout the immersive virtual environment session to perform real-time updates to the immersive virtual environment based on user interaction with the immersive virtual environment and any tactile virtual extensions of the TADs 520.

In addition, in further implementations, a user safety module 580 evaluates real-time positions and motions of the user, real-time positions and motions of all TADs 520, and real-time positions and motions of any tactile virtual extensions of all TADs 520. The user safety module 580 uses this information to automatically position the TADs 520 to ensure that no unintended contact is made or likely to occur between the user and any portion of any TAD or any tactile virtual extensions of any TAD.

2.0 Operational Details of the TAD:

The above-described program modules are employed for implementing various implementations of the TAD. As summarized above, the TAD applies one or more autonomous mobile drones to create real-world real-time tactile feedback corresponding to real-time virtual events, real-time virtual characters, and real-time virtual object positions and motions while the user moves through a real-world space during an immersive VR experience. The following sections provide a detailed discussion of the operation of various implementations of the TAD, and of exemplary methods for implementing the features and program modules described in Section 1 with respect to FIG. 1 and FIG. 2. In particular, the following sections provides examples and operational details of various implementations of the TAD, including:

An operational overview of the TAD;
Tracking and scene capture using drones and drone swarms;
Tracking-based tactile feedback;
User safety; and
Spatial audio source positioning.

2.1 Operational Overview:

As mentioned above, the TAD applies one or more autonomous mobile drones to create real-world real-time tactile feedback corresponding to real-time virtual events, real-time virtual characters, and real-time virtual object positions and motions while the user moves through a real-world space during an immersive VR experience. As such, the TAD may be applied to provide tactile feedback to the user when presenting the immersive virtual environment to the user in an otherwise empty real-world space that gives the user full freedom of motion. In further implementations, the real-world space may contain real objects, people, animals, etc., that may be dynamically tracked for user safety purposes and optionally rendered into the immersive VR experience in positions mapped to their real-world positions. This enables the user to either avoid or interact with the real objects, people, animals, etc., while the user is engaged in the immersive VR experience.

2.2 Tracking and Scene Capture Using Drones and Drone Swarms:

In various implementations, the TAD operations begin by receiving real-time user, drone, and environmental tracking and mapping information from a plurality of sensors. The sensors used for this purpose include any combination of head mounted sensors (e.g., coupled to the VR display device), body worn sensors, sensors embedded in or coupled to each TAD, sensors dispersed throughout the real-world space, etc. Examples of such sensors include, but are not limited to, GPS, proximity sensors (e.g., ultrasonic, capacitive touch, photoelectric, inductive, magnetic, RFID, etc.), motion sensors (e.g., visible light, infrared, ultrasound, microwave/radar technology, accelerometers, inertial sensors, etc.), image sensors, microphones, etc.

The resulting tracking and environmental information is then applied to capture and map the real-world environment (i.e., the scene), track the user and other real people, objects and surfaces in the real-world environment, and to track each TAD in the real-world environment. Some or all of this tracking and environmental information is then consolidated and synched in real-time to the rendering of the immersive virtual environment being presented to the user.

In various implementations, the TAD, or a local, remote, or cloud-based computing system accessible to the TAD, integrates real-time tracking information received from multiple sensors for scene understanding (e.g., real-world environment around the user), user tracking, and user safety purposes. In various implementations, the sensor data is applied to a data fusion process that enables real-time real-world body tracking of users relative to the real-world environment while they participate in the immersive virtual environment. As such, the TADs can operate using both onboard and external sensor arrays that enable each TAD to individually and autonomously position itself to optimally observe the scene and the user. Further, in various implementations, drone swarms (comprising any of a plurality of drone types and sizes) can fly or move around a user as the user moves in the real world space while immersed in the virtual environment.

More specifically, in various implementations, the tracking system component of the TAD maintains a global 3D coordinate system relative to the real-world environment around the user. This tracking system component maintains position $p_{u_i}$ for each user $u_i$ in combination with an orientation $o_{u_i}$ for each user relative to the global coordinate system. Further, in various implementations, the tracking system component of the TAD also tracks a 3D skeleton model $s_{u_i}$ of each user and a 3D hand model $h_{u_i}$ of each of the user's hands.

The tracking system component tracks each TAD in manner similar to tracking of each user. This enables each of the drones, i.e., each TAD, $d_j$, to maintain position $p_{d_j}$, orientation $o_{d_j}$ and fixed transformations $t_{d_j}$, and to position and orient any of the different tactile feedback extensions $e_k$ for each drone and any extended or moving parts of the drone (e.g., rotors, wheels, etc.) relative to the user (or pertinent parts of the user such as outstretched hands).

2.2.1 Hand and Body Tracking:

In the case of user body tracking (or moving object or person tracking), one or more TADs may optionally position themselves around the user in orientations that enable detailed tracking of particular body parts or objects. This enables close tracking of multiple body parts of the user in a way that enables real-time re-creation and rendering of the user body (or some virtual avatar or digital analog) in the same space as the user in way that increases user sense of self when participating in the immersive virtual environment. For example, in contrast to performing hand tracking solely from a head worn device or from fixed sensors, in various implementations, one or more drones moves autonomously to position themselves for improved hand tracking. User's hands can then be accurately tracked and rendered in real-time into the virtual environment.

Consequently, depending on where the user looks in the immersive virtual environment, the user may see a corresponding virtual image of some part of her body that is doing the same thing as the real parts of the user's body (which are not actually visible to the user) while the user interacts with the immersive virtual environment. As a result, in various implementations, the TAD provides tactile feedback while also capturing the scene and persons in the scene in a way that allows users body parts (e.g., hands, torso, legs, etc.) to be rendered into the virtual scene in real time in a way the further increases user sense of self while participating in the immersive virtual environment.

In addition, hand (and optionally full body tracking) can be maintained by the drones even while the user is looking in some other direction. For example, if the user looks towards the ceiling, typical head-worn tracking devices will no longer have the user's hands (or other body parts such as torso, legs, knees, feet, etc.) within their field of view. However, by using the autonomous drones to determine and maintain optimal positions for continued tracking, the immersive virtual environment can be dynamically updated in real-time based on anything that the user is doing with the user's hands or other body parts. Further, in the case that multiple users are sharing the same immersive virtual environment, tracking and rendering of virtual avatars corresponding to the motions of other real users will tend to increase each user's sense of realism with respect to other users in the immersive virtual environment.

2.3 Tracking-Based Tactile Feedback:

Generally, donning a head-mounted display and entering a virtual environment addresses only one of the user's senses (sight). Similarly, donning headphones adds sound to the senses addressed by the virtual environment. However, as mentioned above, the TAD applies various combinations of autonomous flying drones, autonomous mobile robots, and autonomous vehicles to present real surfaces and objects to users in a way that adds tactile feedback to immersive virtual environments. In various implementations, this tactile feedback may also include force-feedback. In such implementations, the surface or object presented to the user may resist, vibrate, shake, or otherwise move based on contact with the user.

In various implementations, the user is allowed to move freely within a designated real-world clutter free space (e.g., no surfaces, objects, or other people that the user may inadvertently contact while in the immersive VR environment. In such implementations, a typical TAD-based VR setup consists of a user-worn VR display device, a designated clutter-free area (where a user can reasonably expect not to run into things), a sensor-based tracking system (referred to herein as a tracking system component) that translates the user and TAD motions and positioning from the real world into the virtual world, and a plurality of TADs with real surfaces and objects that are presented for tactile feedback purposes.

In various implementations, a synchronization component of the overall TAD-based VR system designates specific virtual objects or virtual surfaces within the immersive virtual environment that can be touched by the user as tactile virtual objects. Further, in various implementations, one or more tactile virtual objects may be tagged with various keywords such as soft, hard, wood, metal, plastic, fabric, wet, dry, ball, drink, etc. Using these predetermined keywords allows the TAD to select the most closely matching tactile feedback extension on the drone for presentation to the user in sync with the immersive virtual environment.

In various implementations, tactile virtual objects may be highlighted or otherwise designated (e.g., using glow or any other desired image effect) within the immersive virtual environment to alert the user as to the fact that particular virtual surfaces or objects may actually be touched. When the distance between the user's hands (or other body part) and a tactile virtual object (or surface) decreases, a corresponding TAD and its corresponding tactile virtual object is maneuvered into position based on a prediction of the physical point, p, in the real-world environment where the user will contact the corresponding virtual object, and the time $t_p$ before that contact is predicted to occur. Given the known specifications and movement capabilities of each TAD, an estimate is then made as to the time $t_{d_j}$ that it will take to bring a particular TAD into position. Then, as long as $t_{d_j} \leq t_p$ the TAD is directed to proceed for initiating contact between the user and the surface or object represented by the corresponding tactile feedback extension $e_k$ of the particular TAD, $d_j$.

2.3.1 Multi-Item Carriers:

In various implementations, one or more TADs include a rotating member that includes multiple tactile virtual objects (e.g., real surfaces and objects such as those shown with respect to elements 110, 130 and 150 of FIG. 1) that can be presented to the user based on user interaction with the immersive virtual environment. See also FIG. 2-4, as discussed above. For example, the TAD may rotate, translate, extend, or otherwise position itself, or one or more appendages holding or otherwise carrying one or more tactile virtual objects, to position a particular real object or surface into or next to a user's hand (or other body part). Such objects may be dynamic, e.g., a physical robotic hand extension on a TAD that grips the user's hand and allows the user to physically shake the hand or first bump a virtual character. Such robot hands can be heated and textured to feel like real human skin. Many additional different types of dynamic or active extensions may be presented to the user by the TAD, depending upon the real-time context of the immersive virtual environment.

2.3.2 Positioning Physical Objects:

As mentioned above, the sensor and tracking capabilities of the TAD are synchronized to the immersive virtual environment. In various implementations, this enables one or more of the TADs to optionally pick up and deposit real-world objects in positions to enable or cause contact with the user (or to otherwise pass real-world objects to the user). In other words, in various implementations, the TAD can pick up and drop or otherwise position actual objects in locations that user can pick up or otherwise interact with those objects. For example, if a user reaches out to touch or pick up a virtual object, the autonomous drone may drop or position a real version of that virtual object, or some real analog of the virtual object sufficient to provide tactile feedback to the user.

Similarly, in various implementations, the TAD may act as a butler or robotic device that brings out physical things and surfaces that the user can interact with in the virtual environment. The TAD can then move those things away when the user is done interacting with them. As such, in various implementations, the TAD acts as a type of custodian of real objects and surfaces that are presented to the user in various contexts while the user is participating in an immersive virtual environment.

Subject to the carrying weight and size capabilities of particular TADs, there are no real limits as to what kinds of objects and surfaces may be presented to the user for tactile feedback purposes. In fact, such objects may also include bringing the user real food or drink. For example, the user can walk into a virtual bar in the immersive virtual environment and order a drink from a virtual bartender character. The TAD can then obtain or prepare the ordered drink and present a real drink to the user for consumption. In this case, the user will see the virtual bartender handing or positioning a virtual drink, and when the user reaches out to grasp the virtual drink, the user will actually grasp the real drink positioned by the TAD. Again, such capabilities improve the user experience by dramatically increasing the user's sense of reality while participating in the immersive virtual environment.

2.3.3 Shared Objects:

In a multi-user scenario, two or more instances of a particular device can be dropped or positioned by one or more drones in separate, but synched, immersive virtual environments. For example, assume that a first user is in a location remote from a second user, but that both users are participating in the same (or closely related) virtual environments. In this case, where the first user positions or moves a real or virtual object in the location of the first user relative to the shared virtual environment, a drone in the location of the second user can move or position a real object into a corresponding position in the location of the second user. As such, where the first user hands off, drops, or positions a real or virtual object in the shared virtual environment, the second user can physically interact with a physical proxy of that object within the shared virtual environment. In other words, the TAD may provide coordinated objects and coordinated drones, such that two or more users may interact with what they perceive to be the same objects in a shared virtual environment regardless of where those users actually are in the real world.

For example, consider User 1 in Seattle and User 2 in London that are jointly participating in a shared immersive virtual environment via a networked environment, such as, for example, the Internet. Where User 1 rolls a real or virtual ball across a surface towards a virtual representation of User 2 in the shared virtual environment, a TAD in the physical location of User 2 can then roll a real ball towards User 2 while the TAD-based VR setup renders and displays a corresponding real or virtual image of that ball to User 2. The rendering and display of the image of the ball shown to both User 1 and User 2 in the shared virtual environment will then match the motions of the real ball being passed to User 2. As such, User 2 can catch and physically interact with a real or virtual ball that was originally passed by User 1 from the other side of the world. Such capabilities are not limited to tossing or rolling balls. In fact, any physical or virtual device available to User 1 can be passed or shared with User 2 so long as one or more of the TADs in the real-world space of User 2 includes a corresponding tactile virtual object or some reasonable facsimile thereof.

2.4 User Safety:

In various implementations, the TAD (or the overall TAD-based VR setup) keeps track of the user's position, including his head, torso, arms, hands, legs, feet, etc. The TAD (or the overall TAD-based VR setup) also keeps track of the positions and motions of each individual drone and its various components (e.g., extensions, rotors, body, etc.). In each frame of the VR simulation, or at any desired time interval, the TAD (or the overall TAD-based VR setup) determines the distance between the user's body and the drone's body and rotors or other components. If that distance is beneath a secure threshold, or the movement of the user or drone is too fast to ensure safety, the system immediately breaks off any active tactile feedback, and moves the drone back. Further, in various implementations, the entire virtual environment, or selected portions thereof, may be immediately terminated and replaced with a live video feed (or video pass-through) of the real-world environment around the user in case of emergency or dangerous situations.

Similarly, in various implementations, safety markers, fade in/out of real-world walls or objects, etc., may be rendered into the immersive virtual environment to ensure that the user is not inadvertently bumping into or otherwise making unintended contact with other people, surfaces, objects etc., that exist in the same real-world space as the user.

2.5 Spatial Audio Source Positioning:

As mentioned above, the TAD-based VR setup tracks and positions one or more drones relative to the user in real-time. As such, in various implementations, the TADs may be equipped with audio output devices that are positioned to deliver audio from fixed or moving points in the real-world space around the user. Such implementations are particularly useful where the user does not have headphones or a surround-sound system available for use with the immersive virtual environment. For example, a TAD may be positioned to emit speech from a position corresponding to the mouth of a virtual character in the immersive virtual environment. The user will then perceive that sound as if it were actually coming from the virtual character itself. In other words, in various implementations, the TAD provides a spatial audio source by causing drones to move to particular locations and emit audio (e.g., speech, animal sounds, machine sounds, nature sounds, etc.), thereby further increasing the user's sense of realism in the immersive virtual environment.

Figure 6:
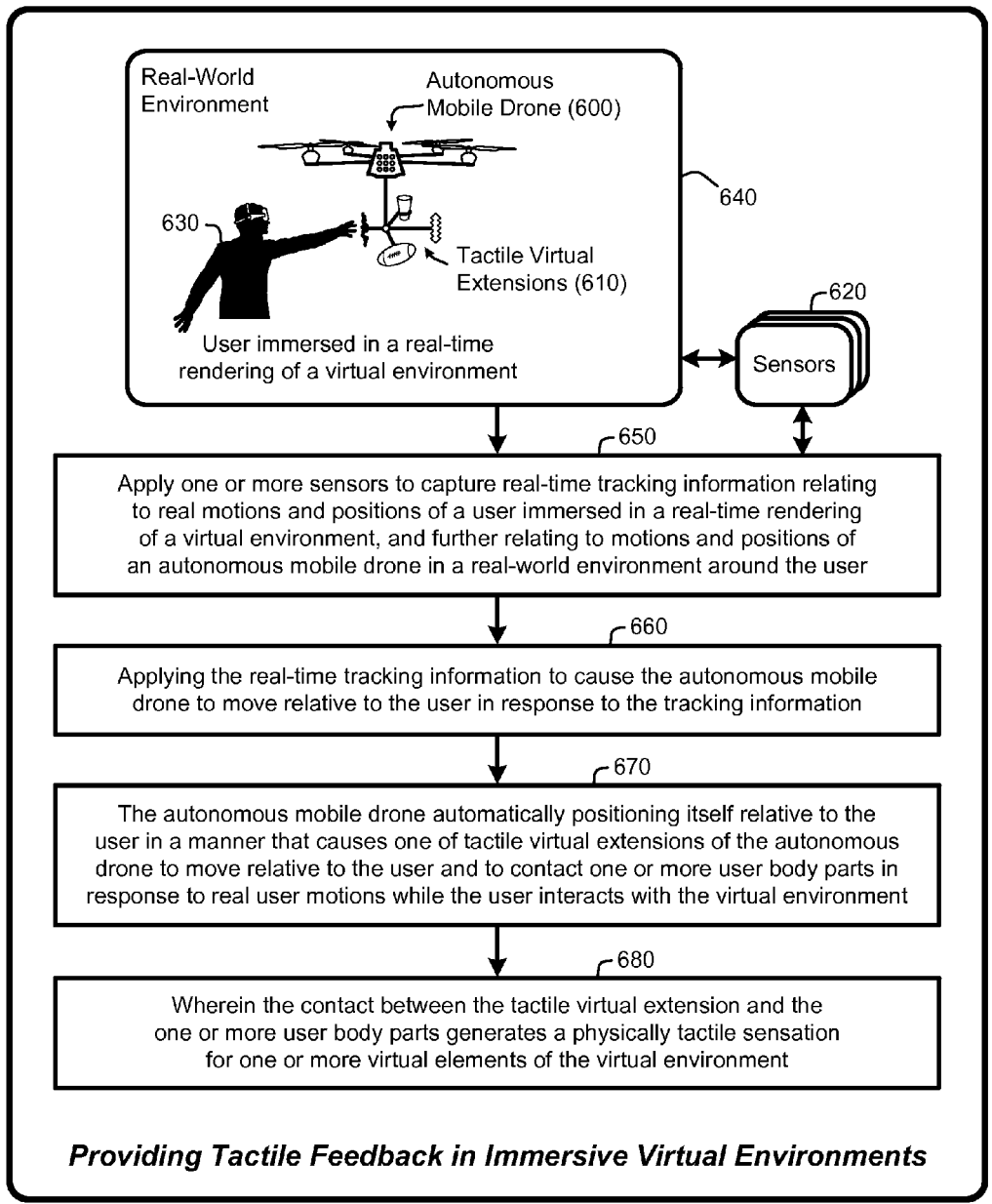
FIG. 6 illustrates a general system flow diagram that illustrates exemplary methods for effecting various implementations of the TAD for providing tactile feedback in immersive virtual environments, as described herein.

3.0 Operational Summary of the TAD:

The processes described above with respect to FIG. 1 through FIG. 5, and in further view of the detailed description provided above in Sections 1 and 2, are illustrated by the general operational flow diagram of FIG. 6. In particular, FIG. 6 provides an exemplary operational flow diagram that summarizes the operation of some of the various implementations of the TAD. FIG. 6 is not intended to be an exhaustive representation of all of the various implementations of the TAD described herein, and that the implementations represented in FIG. 6 are provided only for purposes of explanation.

Further, any boxes and interconnections between boxes that may be represented by broken or dashed lines in FIG. 6 represent optional or alternate implementations of the TAD described herein, and that any or all of these optional or alternate implementations, as described below, may be used in combination with other alternate implementations that are described throughout this document.

In general, as illustrated by FIG. 6, various implementations of the TAD provide a real autonomous mobile drone 600 having one or more tactile virtual extensions 610. The TAD applies (650) one or more sensors 620 to capture real-time tracking information relating to real motions and positions of a user 630 immersed in a real-time rendering of a virtual environment, and further relating to motions and positions of the autonomous mobile drone 600 in a real-world environment 640 around the user.

The TAD then applies (660) the real-time tracking information to cause the autonomous mobile drone 600 to move relative to the user 630 based on the tracking information. The autonomous mobile drone 600 automatically positions (670) itself relative to the user 630 in a manner that causes one of tactile virtual extensions 610 of the autonomous mobile drone to move relative to the user and to contact one or more user body parts based on real user motions while the user interacts with the virtual environment. Further, the contact between the tactile virtual extension and the one or more user body parts generates (680) a physically tactile sensation for one or more virtual elements of the virtual environment.

4.0 Exemplary Implementations of the TAD:

The following paragraphs summarize various examples of implementations that may be claimed in the present document. The implementations summarized below are not intended to limit the subject matter that may be claimed in view of the detailed description of the TAD. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, a TAD is implemented by means, processes or techniques for applying one or more autonomous mobile drones to create real-world real-time tactile feedback corresponding to real-time virtual events, real-time virtual characters, and real-time virtual object positions and motions while the user moves through a real-world space during an immersive VR experience. As such, the TAD enhances and improves user experience and sense of reality when participating in immersive virtual environments by causing contact between real surfaces and one or more user body parts to generate a physically tactile reality corresponding to one or more real-time virtual events, virtual characters, virtual objects or object motions, etc., occurring within the virtual environment.

As a first example, in various implementations, a system is provided via means, processes or techniques for providing tactile feedback. In various implementations, a real autonomous mobile drone having one or more tactile virtual extensions is provided. In various implementations, one or more sensors associated with the drone capture real-time tracking information relating to real motions and positions of a user immersed in a real-time rendering of a virtual environment, and further relating to motions and positions of the autonomous mobile drone in a real-world environment around the user. In various implementations, the real-time tracking information is applied to cause the autonomous mobile drone to move relative to the user based on the tracking information. In various implementations, the autonomous mobile drone automatically positions itself relative to the user in a manner that causes one of tactile virtual extensions of the autonomous mobile drone to move relative to the user and to contact one or more user body parts based on real user motions while the user interacts with the virtual environment. Further, in various implementations, the contact between the tactile virtual extension and the one or more user body parts generates a physically tactile sensation for one or more virtual elements of the virtual environment.

As a second example, in various implementations, the first example is further modified via means, processes or techniques for automatically moving one or more autonomous mobile drones within the real-world environment around the user to maintain optimal positions to apply one or more integral sensors to track and model one or more specific user body parts.

As a third example, in various implementations, any of the first example and the second example are further modified via means, processes or techniques for synchronizing movement of the autonomous mobile drone relative to the user to the real-time rendering of the virtual environment.

As a fourth example, in various implementations, any of the first example, the second example, and the third example are further modified via means, processes or techniques for evaluating real-time positions and motions of the user and the autonomous mobile drone and automatically moving the autonomous mobile drone to ensure that no unintended contact is made between the user and any portion of the autonomous mobile drone.

As a fifth example, in various implementations, any of the first example, the second example, the third example, and the fourth example are further modified via means, processes or techniques for applying one or more autonomous mobile drones to place one or more real objects in the real-world environment around the user in positions mapped to virtual objects in the virtual environment.

As a sixth example, in various implementations, any of the first example, the second example, the third example, the fourth example, and the fifth example are further modified via means, processes or techniques for coupling a plurality of tactile virtual extensions to movable members of the autonomous mobile drone, each movable member capable of moving in multiple dimensions to accurately position one or more of the tactile virtual extensions relative to the user.

As a seventh example, in various implementations, any of the first example, the second example, the third example, the fourth example, the fifth example, and the sixth example are further modified via means, processes or techniques for presenting the real-time rendering of the virtual environment to the user in an otherwise empty real-world environment around the user that allows the user full freedom of motion.

As an eighth example, in various implementations, any of the first example, the second example, the third example, the fourth example, the fifth example, the sixth example, and the seventh example, are further modified via means, processes or techniques for rendering one or more safety markers into the immersive virtual environment to alert the user as to real elements existing within the real-world environment around the user.

As a ninth example, in various implementations, any of the first example, the second example, the third example, the fourth example, the fifth example, the sixth example, the seventh example, and the eighth example are further modified via means, processes or techniques for replacing the real-time rendering of a virtual environment with a live video of the real-world environment around the user whenever it is likely that the user may make unintended contact with the autonomous mobile drone.

As a tenth example, in various implementations, any of the first example, the second example, the third example, the fourth example, the fifth example, the sixth example, the seventh example, the eighth example, and the ninth example are further modified via means, processes or techniques for enabling the autonomous mobile drone for autonomous flight in the real-world environment around the user.

As an eleventh example, in various implementations, any of the first example, the second example, the third example, the fourth example, the fifth example, the sixth example, the seventh example, the eighth example, the ninth example, and the tenth example are further modified via means, processes or techniques for causing the tactile virtual extension to initiate a force-feedback upon contact between the tactile virtual extension and the one or more user body parts.

As a twelfth example, in various implementations, any of the first example, the second example, the third example, the fourth example, the fifth example, the sixth example, the seventh example, the eighth example, the ninth example, the tenth example, and the eleventh example are further modified via means, processes or techniques for applying an audio output device coupled to the autonomous mobile drone to position itself to deliver sound from one or more points in the real-world space around the user, said sound being coordinated with and mapped to positions of corresponding virtual elements in the virtual environment.

As a thirteenth example, in various implementations, a method is provided via means, processes or techniques for providing tactile feedback in immersive VR. In various implementations, one or more sensors are applied to capture real-time tracking information. In various implementations, this real-time tracking information includes real motions and positions of a user immersed in a real-time VR, and motions and positions of a plurality of real autonomous drones. In various implementations, this real-time tracking information is applied to cause one or more of the autonomous drones to automatically position one or more tactile virtual extensions coupled to the autonomous drone to contact one or more user body parts based on real user motions while the user interacts with the real-time VR. In various implementations, the contact between the tactile virtual extension and the one or more user body parts is synchronized and mapped to one or more virtual elements of the real-time VR such that the contact generates a physically tactile sensation for one or more virtual elements of the real-time VR. IN various implementations, a safety mechanism is applied by evaluating real-time positions and motions of the user and each of the autonomous drones, to automatically cause the autonomous drones to move to positions that ensure that no unintended contact is made between the user and any portion of any autonomous drone.

As a fourteenth example, in various implementations, the thirteenth example is further modified via means, processes or techniques for applying one or more sensors integral to one or more of the autonomous drones to maintain optimal positions to track and model one or more specific user body parts.

As a fifteenth example, in various implementations, any of the thirteenth example and the fourteenth example are further modified via means, processes or techniques for applying one or more autonomous drones to place one or more real objects in a real-world environment around the user in positions mapped to virtual elements of the real-time VR.

As a sixteenth example, in various implementations, any of the thirteenth example, the fourteenth example, and the fifteenth example are further modified via means, processes or techniques for applying one or more autonomous drones to cause the tactile virtual extension to initiate a force-feedback via one or more tactile virtual extensions upon contact between the tactile virtual extension and the one or more user body parts.

As a seventeenth example, in various implementations, any of the thirteenth example, the fourteenth example, the fifteenth example, and the sixteenth example are further modified via means, processes or techniques for coupling a plurality of tactile virtual extensions to movable members of one or more autonomous drones, each movable member capable of moving in multiple dimensions to accurately position one or more of the tactile virtual extensions relative to the user.

As an eighteenth example, in various implementations, a computer-implemented process is provided via means, processes or techniques for directing a plurality of autonomous drones to maintain optimum positions for obtaining tracking information for one or more specific body parts of a user. In various implementations, the tracking information is applied to model the specific body parts and render those body parts into an immersive virtual environment being presented to the user. In various implementations, the tracking information is applied to cause one or more of the autonomous drones to automatically position one or more tactile virtual extensions coupled to the autonomous drones to contact one or more user body parts based on real user motions while the user interacts with the immersive virtual environment. In various implementations, the contact between the tactile virtual extension and the one or more user body parts is synchronized and mapped to one or more virtual elements of the immersive virtual environment such that the contact generates a physically tactile sensation for one or more virtual elements of the immersive virtual environment.

As a nineteenth example, in various implementations, the eighteenth example is further modified via means, processes or techniques for applying a safety mechanism that evaluates real-time positions and motions of the user and each of the autonomous drones, and automatically directing the autonomous drones to move to positions that ensure that no unintended contact is made between the user and any portion of any autonomous drone.

As a twentieth example, in various implementations, any of the eighteenth example and the nineteenth example are further modified via means, processes or techniques for directing one or more autonomous drones to place one or more real objects in a real-world environment around the user in positions mapped to virtual elements of the immersive virtual environment.

5.0 Exemplary Operating Environments

Figure 7:
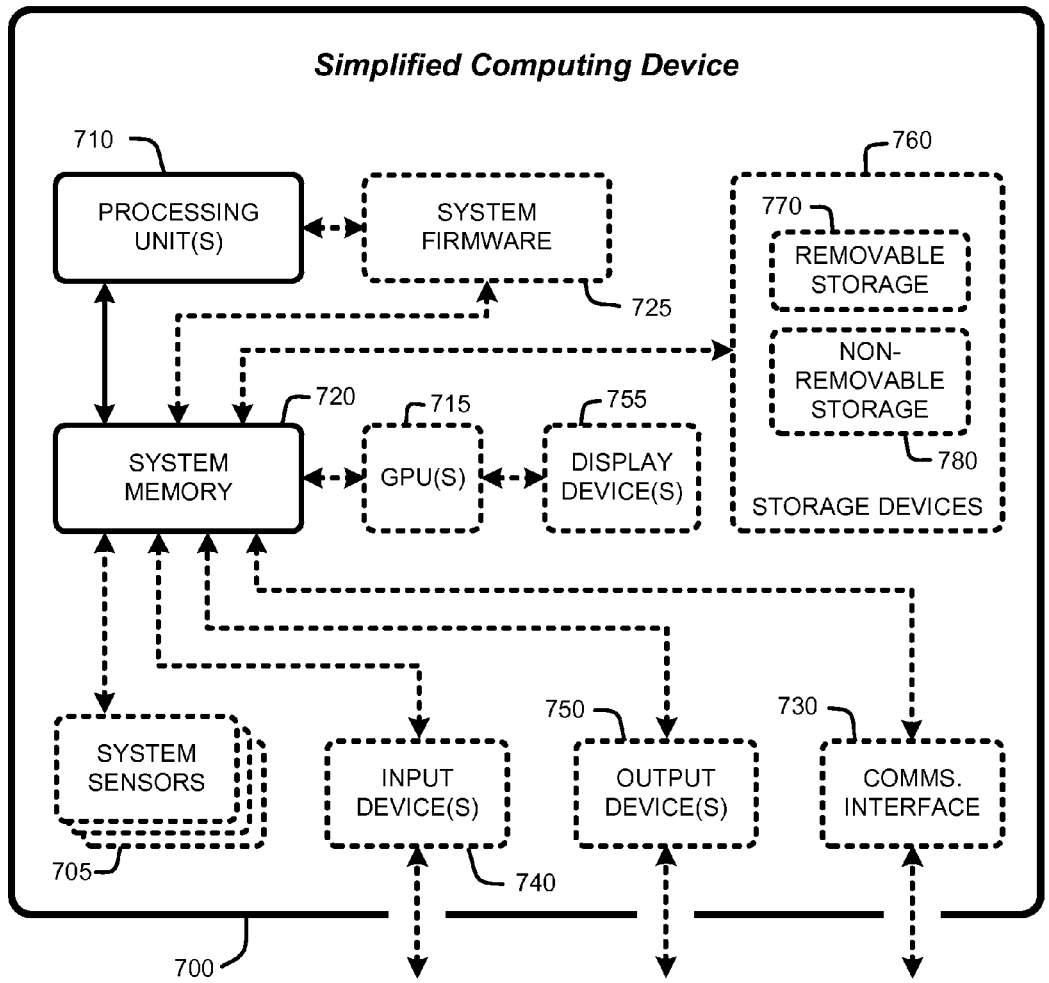
FIG. 7 is a general system diagram depicting a simplified general-purpose computing device having simplified computing and I/O capabilities for use in effecting various implementations of the TAD, as described herein.

The TAD implementations described herein are operational within numerous types of general purpose or special purpose computing system environments or configurations. FIG. 7 illustrates a simplified example of a general-purpose computer system on which various implementations and elements of the TAD, as described herein, may be implemented. Any boxes that are represented by broken or dashed lines in the simplified computing device 700 shown in FIG. 7 represent alternate implementations of the simplified computing device. As described below, any or all of these alternate implementations may be used in combination with other alternate implementations that are described throughout this document.

The simplified computing device 700 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the TAD implementations described herein, the device should have a sufficient computational capability and system memory to enable basic computational operations. In particular, the computational capability of the simplified computing device 700 shown in FIG. 7 is generally illustrated by one or more processing unit(s) 710, and may also include one or more graphics processing units (GPUs) 715, either or both in communication with system memory 720. The processing unit(s) 710 of the simplified computing device 700 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 700 may also include other components, such as, for example, a communications interface 730. The simplified computing device 700 may also include one or more conventional computer input devices 740 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 700 and with any other component or feature of the TAD, including input, output, control, feedback, and response to one or more users or other devices or systems associated with the TAD, are enabled by a variety of Natural User Interface (NUI) scenarios. The NUI techniques and scenarios enabled by the TAD include, but are not limited to, interface technologies that allow one or more users user to interact with the TAD in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 740 or system sensors 705. Such NUI implementations are also enabled by the use of various techniques including, but not limited to, information derived from system sensors 705 or other input devices 740 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the TAD.

However, the aforementioned exemplary NUI scenarios may be further augmented by combining the use of artificial constraints or additional signals with any combination of NUI inputs. Such artificial constraints or additional signals may be imposed or generated by input devices 740 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the TAD.

The simplified computing device 700 may also include other optional components such as one or more conventional computer output devices 750 (e.g., display device(s) 755, audio output devices, video output devices, devices for transmitting wired or wireless data transmissions, and the like). Typical communications interfaces 730, input devices 740, output devices 750, and storage devices 760 for general-purpose computers are well known to those skilled in the art, and will not be described in detail herein.

The simplified computing device 700 shown in FIG. 7 may also include a variety of computer-readable media. Computer-readable media can be any available media that can be accessed by the computing device 700 via storage devices 760, and include both volatile and nonvolatile media that is either removable 770 and/or non-removable 780, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), BLU-RAY discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various TAD implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 725, hardware, or any combination thereof to control a computer to implement the disclosed subject matter. The term "article of manufacture" as used herein is intended to encompass a computer program accessible from any computer-readable device, or media.

The TAD implementations described herein may be further described in the general context of computer-executable instructions, such as program modules, being executed by a computing device. Generally, program modules include routines, programs, objects, components, data structures, and the like, that perform particular tasks or implement particular abstract data types. The TAD implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the TAD has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the TAD. It is intended that the scope of the TAD be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the TAD described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A system, comprising:
   a processor; and
   a memory comprising instructions that, when executed by the processor, cause the processor to perform a method comprising:
      generating a real-time rendering of a virtual environment;

receiving real-time tracking information from one or more sensors, the real-time tracking information relating to real motions and positions of a user immersed in the real-time rendering of the virtual environment, the real-time tracking information further relating to motions and positions of an autonomous mobile drone in a real-world environment around the user;

responsive to receipt of the real-time tracking information, directing the autonomous mobile drone to move relative to the user;

further responsive to receipt of the real-time tracking information, directing the autonomous mobile drone to automatically deposit a real-world object in a position within the real-world environment that enables one or more user body parts to contact that object based on real user motions while the user interacts with the virtual environment;

responsive to depositing the real-world object by the autonomous mobile drone, rendering a virtual representation of the real-world object into a corresponding position in the virtual environment; and wherein contact between the real-world object and the one or more user body parts generates a physically tactile sensation for the virtual representation of the real-world object.

2. The system of claim 1 further comprising directing one or more additional autonomous mobile drones to automatically move within the real-world environment around the user to maintain optimal positions to apply one or more integral sensors to track and model one or more specific user body parts.

3. The system of claim 1 wherein the movement of the autonomous mobile drone relative to the user is further synchronized to the real-time rendering of the virtual environment.

4. The system of claim 1 further comprising evaluating real-time positions and motions of the user and the autonomous mobile drone and automatically directing movement of the autonomous mobile drone to ensure that no unintended contact is made between the user and any portion of the autonomous mobile drone.

5. The system of claim 1 directing the autonomous mobile drone to automatically position itself relative to the user in a manner that causes one or more tactile virtual extensions of the autonomous mobile drone to contact one or more user body parts based on real user motions while the user interacts with the virtual environment.

6. The system of claim 5 further comprising causing the tactile virtual extension of the autonomous mobile drone to initiate a force-feedback upon contact between the tactile virtual extension and the one or more user body parts.

7. The system of claim 1 wherein a plurality of tactile virtual extensions are coupled to movable members of the autonomous mobile drone, each movable member capable of moving in multiple dimensions to accurately position one or more of the tactile virtual extensions relative to the user.

8. The system of claim 1 further comprising presenting the real-time rendering of the virtual environment to the user in an otherwise empty real-world environment around the user that allows the user full freedom of motion.

9. The system of claim 1 further comprising rendering one or more safety markers into the immersive virtual environment to alert the user as to real elements existing within the real-world environment around the user.

10. The system of claim 1 further comprising replacing the real-time rendering of a virtual environment with a live video of the real-world environment around the user based on a measured distance between the user and the autonomous mobile drone to ensure that no unintended contact is made between the user and the autonomous mobile drone.

11. The system of claim 1 wherein the autonomous mobile drone is capable of autonomous flight in the real-world environment around the user.

12. The system of claim 1 further comprising an audio output device coupled to the autonomous mobile drone, and further comprising causing the audio output device of the autonomous mobile drone to deliver sound from one or more points in the real-world space around the user, said sound being coordinated with and mapped to positions of corresponding virtual elements in the virtual environment.

13. A method, comprising:

generating a real-time rendering of a virtual environment;

displaying the real-time rendering of the virtual environment via a head-worn virtual reality display device;

receiving real-time tracking information from one or more sensors, the real-time tracking information relating to real motions and positions of a user immersed in the real-time rendering of the virtual environment, the real-time tracking information further relating to motions and positions of an autonomous mobile drone in a real-world environment around the user;

responsive to receipt of the real-time tracking information, directing the autonomous mobile drone to move relative to the user;

further responsive to receipt of the real-time tracking information, directing the autonomous mobile drone to automatically deposit a real-world object in a position within the real-world environment that enables one or more user body parts to contact that object based on real user motions while the user interacts with the virtual environment;

responsive to depositing the real-world object by the autonomous mobile drone, rendering a virtual representation of the real-world object into a corresponding position in the virtual environment; and wherein contact between the real-world object and the one or more user body parts generates a physically tactile sensation for the virtual representation of the real-world object.

14. The method of claim 13 further comprising directing one or more additional autonomous mobile drones to automatically move within the real-world environment around the user to maintain optimal positions to apply one or more integral sensors to track and model one or more specific user body parts.

15. The method of claim 13 further comprising synchronizing the movement of the autonomous mobile drone relative to the user to the real-time rendering of the virtual environment.

16. The method of claim 13 further comprising evaluating real-time positions and motions of the user and the autonomous mobile drone and automatically directing movement of the autonomous mobile drone to ensure that no unintended contact is made between the user and any portion of the autonomous mobile drone.

17. The method of claim 13 further comprising directing the autonomous mobile drone to automatically position itself relative to the user in a manner that causes one or more tactile virtual extensions of the autonomous mobile drone to contact one or more user body parts based on real user motions while the user interacts with the virtual environment.

18. The method of claim 13 further comprising directing a plurality of tactile virtual extensions that are coupled to movable members of the autonomous mobile drone to move in one or more dimensions to accurately position one or more of the tactile virtual extensions relative to one or more body parts of the user.

19. The method of claim 13 further comprising rendering one or more safety markers into the immersive virtual environment to alert the user as to real elements existing within the real-world environment around the user.

20. A computer-readable storage device having computer executable instructions stored therein for rendering a real-time virtual environment and directing one or more autonomous mobile drones, said instructions causing a computing device to execute a method comprising:

generating a real-time rendering of a virtual environment within a user-worn virtual reality display device;

receiving real-time tracking information from one or more sensors, the real-time tracking information relating to real motions and positions of a user immersed in the real-time rendering of the virtual environment, the real-time tracking information further relating to motions and positions of one or more autonomous mobile drone in a real-world environment around the user;

responsive to receipt of the real-time tracking information, directing one or more of the autonomous mobile drones to move relative to the user;

further responsive to receipt of the real-time tracking information, directing one or more of the autonomous mobile drones to automatically deposit one or more real-world objects in positions within the real-world environment that enables one or more user body parts to contact those objects based on real user motions while the user interacts with the virtual environment;

responsive to depositing the one or more real-world objects by the one or more autonomous mobile drones, rendering corresponding virtual representations of the real-world objects into corresponding positions in the virtual environment; and wherein contact between any of the real-world objects and the one or more user body parts generates a physically tactile sensation for the virtual representation of the corresponding real-world object.

* * * * *